United States Patent [19]

Granum et al.

[11] Patent Number: 4,613,086
[45] Date of Patent: Sep. 23, 1986

[54] FOOD PROCESSING MACHINE

[76] Inventors: Michael J. Granum, 14590 SE. 262, Boring, Oreg. 97009; Walter J. Steffan, P.O Box 116, Tygh Valley, Oreg. 97063

[21] Appl. No.: 629,262

[22] Filed: Jul. 10, 1984

Related U.S. Application Data

[63] Continuation-in-part of Ser. No. 417,410, Sep. 13, 1982, abandoned.

[51] Int. Cl.$^4$ .............................................. B02C 9/04
[52] U.S. Cl. ........................... 241/101 B; 241/101.2; 241/259.1; 241/261.1; 366/97
[58] Field of Search ............. 241/101 B, 101.2, 169.1, 241/199.6, 199.7, 199.12, 261.1, 259.1, 961, 245, 248; 366/97, 98, 100

[56] References Cited

U.S. PATENT DOCUMENTS 3,952,958  4/1976  Rich ............... 241/261.1 X
3,966,178  6/1976  Stevens ........................ 241/101 B
4,037,798  7/1977  Schnitzer ........................ 241/101.2

FOREIGN PATENT DOCUMENTS 2224305 11/1973 Fed. Rep. of Germany ... 241/101 B
2226963 11/1974 France .............. 241/101 B Primary Examiner—Mark Rosenbaum
Assistant Examiner—Joseph M. Gorski
Attorney, Agent, or Firm—Eugene M. Eckelman

[57] ABSTRACT

A base frame supports a hopper for receiving grain to be ground and made into bread. An inverted cone-shaped grinding head on the shaft is supported at the bottom of the hopper and cooperates with a base member having a recess corresponding in shape to the grinder. The cone-shaped grinding head is spaced from the base to form a grinding area and grinding is accomplished by upright surface grooves in the base member and grinding teeth on the grinding head. The grinding head has an inlet passageway leading to the grinding area and the base member has outlet means at the top of the grinding area to discharge ground grain which is forced upwardly by centrifugal force as well as the augering action of the grinding surface. The shaft supports a mixing arm at the bottom thereof having an angle bend which provides simultaneous mixing and kneading of ingredients into bread dough. The bread dough making apparatus is combined with apparatus for driving food processing attachments such as a blender and meat grinder.

6 Claims, 17 Drawing Figures

U.S. Patent  Sep. 23, 1986  Sheet 1 of 5  4,613,086
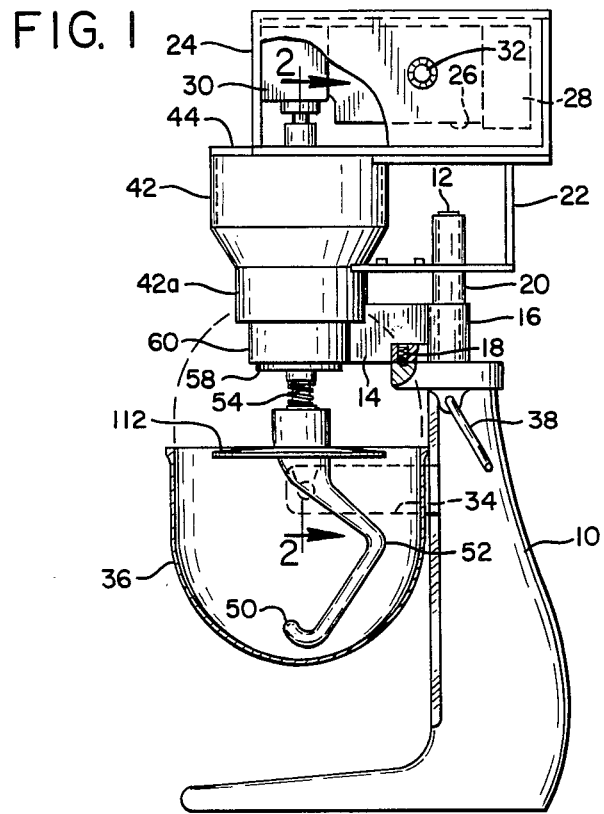
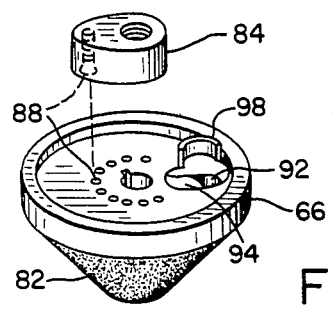
FIG. 3
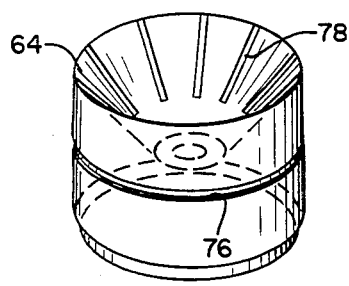
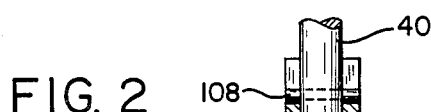
FIG. 2
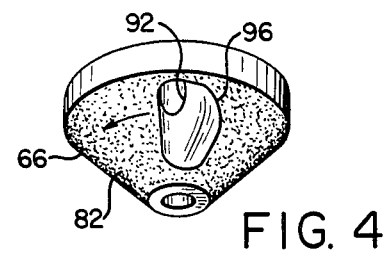
FIG. 4
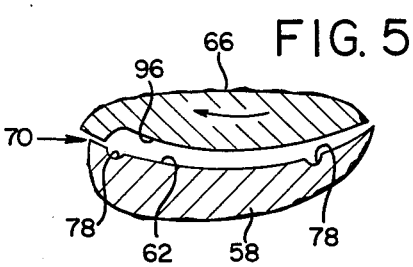
FIG. 5

4,613,086

FOOD PROCESSING MACHINE

REFERENCE TO PRIOR APPLICATIONS

This application is a continuation-in-part of application Ser. No. 417,410, filed Sept. 13, 1982, for Bread Dough Making Machine, abandoned.

BACKGROUND OF THE INVENTION

This invention relates to new and useful improvements in food processing machines and more particularly relates to a bread dough making machine as well as such a machine in combination with other food processing means.

Bread dough making machines have become quite popular, especially smaller type machines that can be used by a consumer for making homemade bread. It is necessary that such machines be relatively simplified in construction and simplified as well in operation. Also, such structures must be relatively compact so as to fit conveniently in a portion of the home especially in or adjacent to the kitchen area. Prior devices that have been marketed are not considered to include features which accomplish all the above advantages. Other processing apparatuses have been marketed including blenders, grinders, etc.

SUMMARY OF THE INVENTION

According to the present invention, a primary objective of the invention is to provide a bread dough making machine that is simplified in its structure and operation and has a compact structure which facilitates its use in the kitchen similar to other kitchen appliances.

Another object of the invention is to provide a bread dough making machine that is capable simultaneously of grinding grain and of receiving other bread dough ingredients whereby grinding, mixing and kneading of the dough can be accomplished in one step.

Another object of the invention is to provide a bread dough making machine that requires little or no attendance after the grain and other ingredients have been inserted.

Another object of the invention is to provide a novel grinding portion of a bread dough making machine that is simplified in structure and has adjustment means which allow the particle size of the ground grain readily to be varied.

Still another object is to provide a bread dough making machine having a novel combination with other food processing means.

In carrying out the objectives of the invention, a hopper is supported on a base frame for receiving grain to be ground. An inverted cone-shaped grinding head is supported on an upright powered shaft and is associated with a tapered recess in a stationary base member to form grinding means. An adjustment is provided between the grinding head and base member to vary the spacing of the grinding area and thus to vary the particle size of the ground grain. The walls of the recess have upright surface grooves and the walls of the cone-shaped member having grinding teeth cooperating with these grooves to form the grinding means. Also, an upright passageway leads along the surface of the cone-shaped member and opens through the top of the latter to provide a passageway for feeding grain to be ground. The ground grain is forced upwardly in the grinding area by centrifugal force and outlet means are provided between the grinding head and a bottom flange of the hopper to direct the ground grain downwardly into a mixing bowl. The bottom end of the upright shaft has a mixing arm arranged to operate in the mixing bowl to mix the grain and other ingredients and to simultaneously knead the bread dough. The bread dough making machine is combined in a food processor having a blender and an output for a grinder and other attachments.

The invention will be better understood and additional objects and advantages will become apparent from the following description taken in connection with the accompanying drawings.

BRIEF DESCRIPTION OF THE DRAWINGS

FIG. 1 is a side elevational view of a bread dough making machine embodying a first form of the present invention;

FIG. 2 is an enlarged vertical fragmentary sectional view taken on the line 2—2 of FIG. 1;

FIG. 3 is an exploded perspective view of the grinding portion of the machine;

FIG. 4 is a bottom perspective view of a grinding head which forms one element of the grinding portion;

FIG. 5 is an enlarged fragmentary sectional view taken on the line 5—5 of FIG. 2;

DETAILED DESCRIPTION OF PREFERRED EMBODIMENTS

Figure 6:
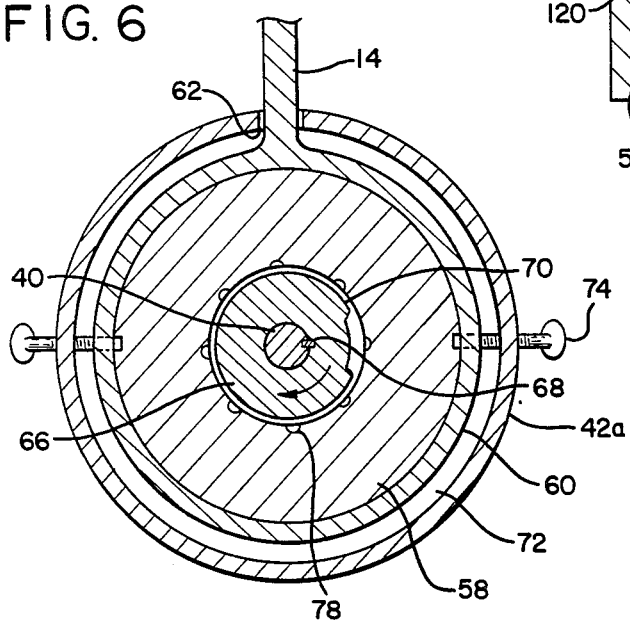
FIG. 6 is a fragmentary sectional view taken on the line 6—6 of FIG. 2.

With particular reference first to FIGS. 1-6, one form of the invention is illustrated employing a stand or base member 10 having an upright post 12 on the top thereof supporting a laterally extending arm 14, FIGS. 1 and 6, by hub means 16. Arm 14 has a releasable latched connection with the top of the stand 10 by means of a spring pressed retractable latch 18. The arm can be pivoted on the base by forcing it away from its latched position and will automatically latch in position when returned. A second hub 20 on the post 12 seats on the hub 16 and has a bracket 22 secured to it which is connected to a housing 24 enclosing an electric motor 26 and an air cooling fan 28 for the motor. Motor 26 is associated with a gear reduction unit 30 and also has speed control means 32 in its electric circuit.

Stand 10 has bracket arms 34 for removably supporting a mixing bowl 36 in a conventional manner. Bracket arms 34 are capable of being raised and lowered by crank means 38 also of conventional structure.

Output shaft 40 from the gear reduction unit 30 leads down through a hopper 42 arranged to receive grain to be ground, the latter being poured into the hopper through a top lid 44. Hopper 42 has a lower flange portion 42a. Shaft 40 also leads down through a grinding portion 48 of the machine and supports a mixing attachment 50 at its lower end which has an angle bend 52 providing a mixing and kneading action to bread dough. Mixing attachment 50 is removably mounted on the shaft by a conventional releasable catch 54.

Grinder portion 48 employs a base member 58 having a supporting casing 60 on the end of arm 14. Arm 14 passes through a slot 62, FIG. 6, in the flange portion 42a of the hopper 42. The upper portion of the base member 58 has a tapered recess 64, and such recess is associated with an inverted cone-shaped grinding head 66 keyed to the shaft 40 by key 68. A grinding area 70 is formed between the head 66 and base member 58 and the key connection 68 allows vertical, adjusted positioning of the grinding head 66 to vary the depth of such grinding area, as will be more apparent hereinafter.

Flange 42a of the hopper is larger in diameter than the base member 58 to form an area 72 therebetween which as will be seen comprises a discharge passageway for grain which has been ground into flour. The hopper 42 is removably supported on the base member 58 by set screws 74 passing through the flange 42a and engaging a peripheral groove 76 in the base member.

The recess 64 has a plurality of upright surface grooves 78, FIGS. 3 and 5, and the bottom surface of the grinding head 64 has a grinding surface 82 which cooperates with the grooves 78 to reduce raw grain into a small particle form such as flour. Surface 82 comprises toothed projections or other roughened area such as a knurled surface.

The grinding head 66 is held down by a nut 84 having threaded engagement with a threaded portion 86 of the shaft 40. Nut 84 is held in a selected position on such threaded portion by a spring pressed latch assembly 88. By suitable adjustment of the nut 84, the spacing of the grinding area 70 can be regulated to control the size of particle desired.

The infeed to the grinding area 70 comprises an upright passageway 92 offset from the center of the head 66 and opening through the top of the head in a surface widened recess 94. The bottom of passageway 92 opens into the grinding area 70 by an elongated upright surface groove 96 in the head 66. An upstanding cup-shaped scoop 98 is provided on the trailing side of the recess 94, and upon rotation of the grinding head, such scoop picks up grain for directing it into the recess 94 and into passageway 92. The driving force of this scoop as it rotates with the head urges the grain downwardly to counteract centrifugal force and thus the grain is held down as it is ground. The presence of the grain being ground and the downward pressure thereon resulting from the action of scoop 98 drives the grinding head 66 upwardly against the nut 84, and as stated, the adjustment of this nut on the shaft determines the particle size of the ground grain.

The ground grain will move upwardly through the grinding area 70 under the influence of centrifugal force, whereby such upwardly moving ground grain flows into the space 72 and falls by gravity into the mixing bowl. The method of discharge of the ground grain, wherein the discharge thereof is upward by centrifugal force, provides an efficient grinding function and one which can be readily controlled by the speed of operation of the grinding head 66. By adjustment of the nut 84, the particle size of the ground grain can also readily be controlled.

Shaft 40 has journaled engagement with the hopper 46 and base member 58 by suitable bearings 104 and 106, respectively. Such shaft has a detachable pin drive connection 108 at the top of the hopper so that the motor unit can readily be separated from the hopper, and a similar detachable pin drive connection 110 is provided in the shaft between the hopper 42 and the base member 58 to allow the hopper to be removed from the base member.

Mixing arm 50 has an upper flange 112 which prevents ingredients in the mixing bowl from being thrown over the top of the mixing bowl. This flange is smaller in diameter than the mixing bowl and ground grain that falls thereon from above slides off into the bowl as a result of centrifugal force.

In the process of making bread dough, the raw grain to be used is placed in the hopper 46 and other ingredients are put into the mixing bowl. As the grain is ground, it is mixed with the other ingredients and kneaded whereby grinding and kneading are accomplished simultaneously. Once the ingredients are inserted, the mechanism will operate without attendance. It merely has to be shut off after a selected time of operation and such can be readily accomplished by conventional timer means in the electric circuit.

Figure 7:
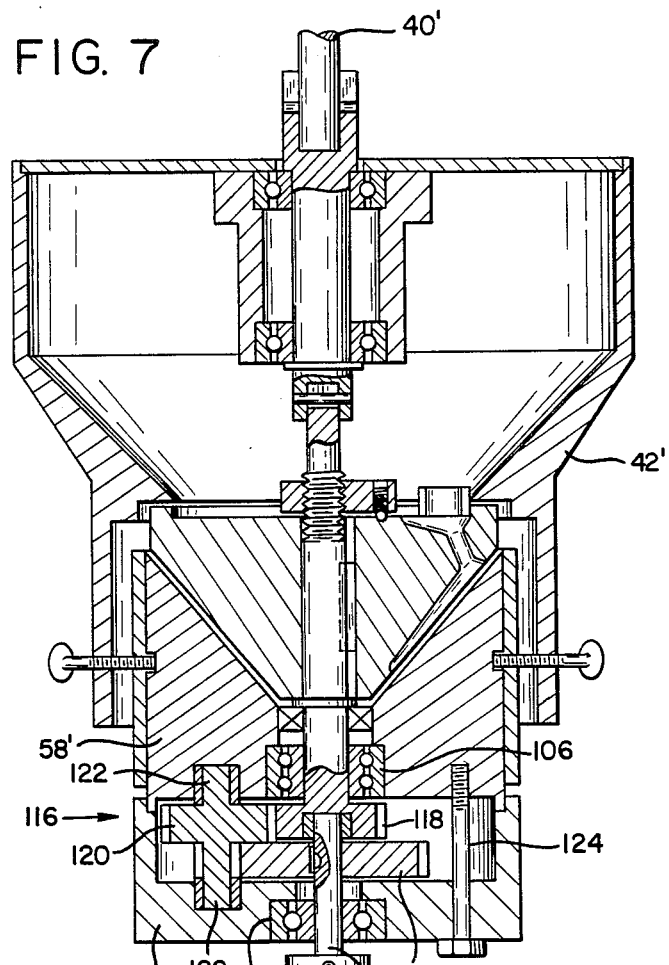
FIG. 7 is a sectional view similar to FIG. 2 but showing a further embodiment of the bread dough making machine.

FIG. 7 illustrates an embodiment having a gear reduction assembly 116 in the shaft 40' for the purpose of further controlling the speed of the shaft. In such embodiment, the base member 58' and hopper 42' are substantially identical to that shown in FIG. 2. The gear reduction assembly 116 comprises a pinion gear 118 integral with the bottom end of shaft 40' and having meshing engagement with a reduction gear 120 journaled by end stub shafts 122 in the base member 58' and in an extension 58a' secured to the base member 58', as by screws 124. Reduction gear 120 meshes with a larger gear 126 keyed to a lower shaft segment 32a'. Such lower shaft segment has journaled connection to the pinion gear 118 and to the base member extension 58a by a bearing 128.

Figure 8:
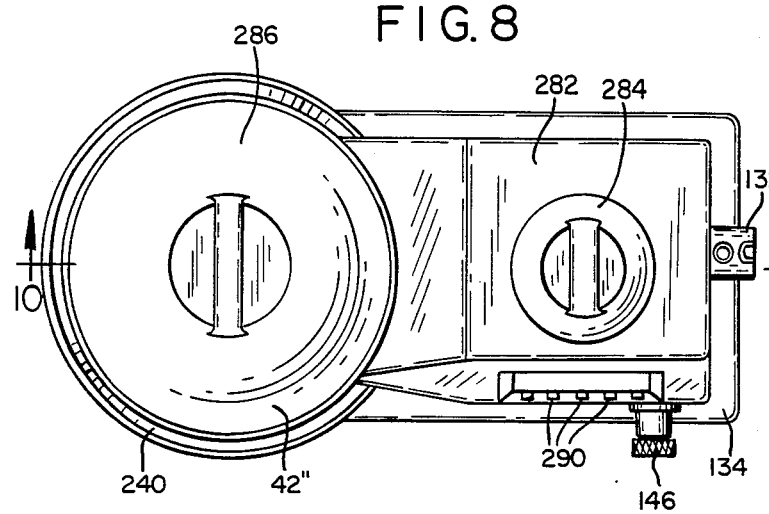
FIG. 8 is a top plan view of a food processing machine including a bread dough making machine and other food processing means.
Figure 9:
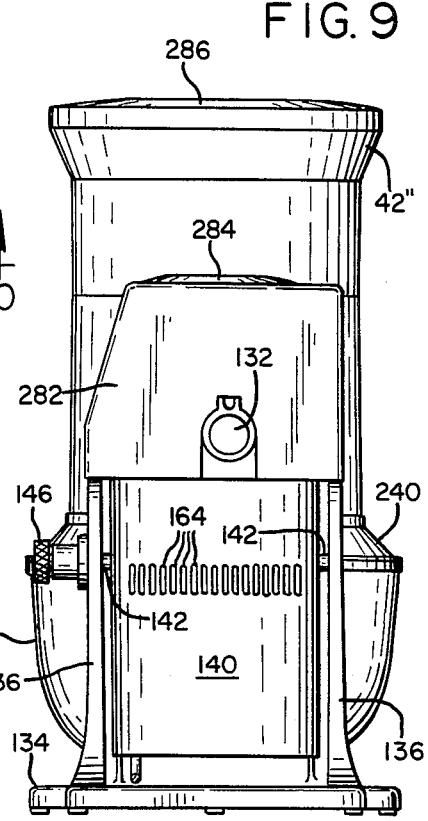
FIG. 9 is a front elevational view of the machine of FIG. 8 taken from the right ide of the latter figure.
Figure 10:
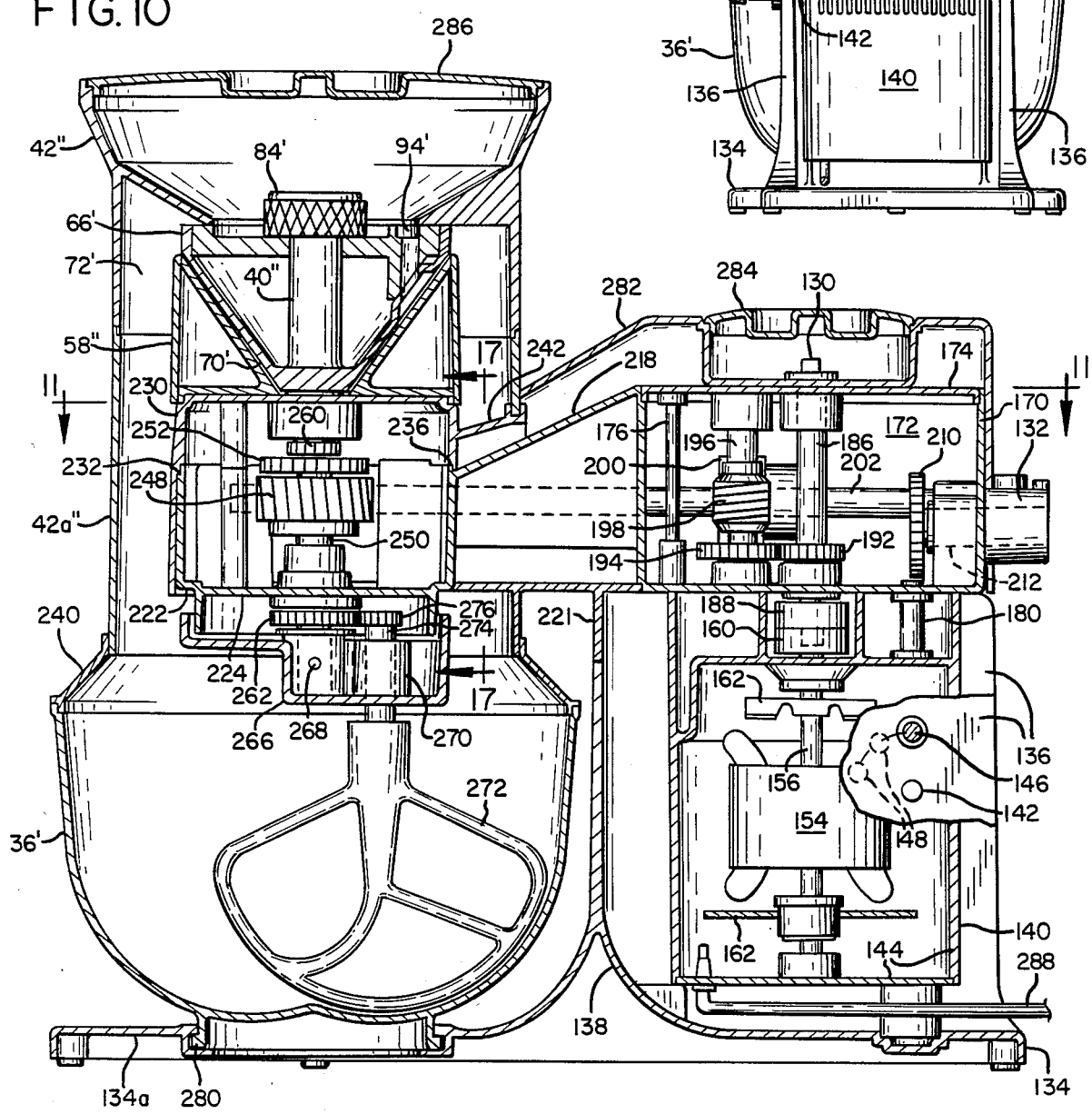
FIG. 10 is an enlarged vertical sectional view taken on the line 10—10 of FIG. 8.

With reference to FIGS. 8–16, a concept of the invention includes a combination of a bread dough making machine and other food processing means such as a blender drive 130, FIG. 10, and a power take-off 132, FIGS. 8–12, for grinders or other attachments. The blender drive 130 and the power take-off 132 are conventional for releasable connection to the selected attachments.

The embodiments of FIGS. 8–16 includes a stand or base member 134, FIGS. 8–10, having a pair of upright, laterally spaced standards 136 with a reinforcing shaped web 138 therebetween. This stand pivotally supports a motor housing 140 by means of laterally extending pivots 142. The housing 140 has enclosing side, end, and bottom walls 144 but the top thereof is open. Such housing is arranged to be locked in various positions of pivoted adjustment on the stand by means of a spring pressed latch mechanism 146 supported in the stand on one side and releasably engageable with a selected one of several apertures 148. In the position shown in FIG. 10, the motor housing is locked in a vertical position by engagement of the latch mechanism 146 in one of the apertures 148 and the other apertures 148 are located to provide a fixed pivoted position of the housing in the other positions.

Housing 140 encloses a variable speed motor 154 having a doubled ended output shaft 156 suitably journaled in the housing and terminating at its upper end in a coupling portion 160. The shaft 156 carries cooling fans 162 for the motor, and the housing 140 has vent holes 164, FIG. 9, for circulation of air.

A transmission housing 170, FIGS. 10–13, 15 and 16, seats on the motor housing 140 and includes a rear enclosure 172 having a cover plate 174 removably attached by screws 176. Housing 170 is securely but removably attached to motor housing 140 by screw means 180.

Figure 11:
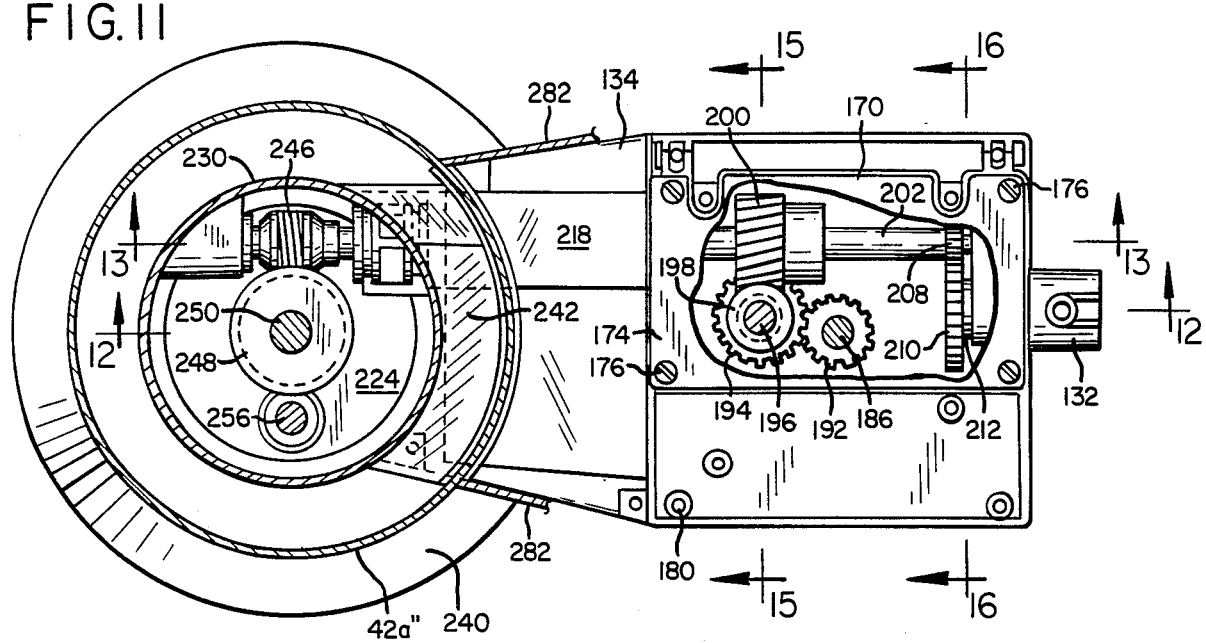
FIG. 11 is a horizontal fragmentary sectional view taken on the line 11—11 of FIG. 10.
Figure 12:
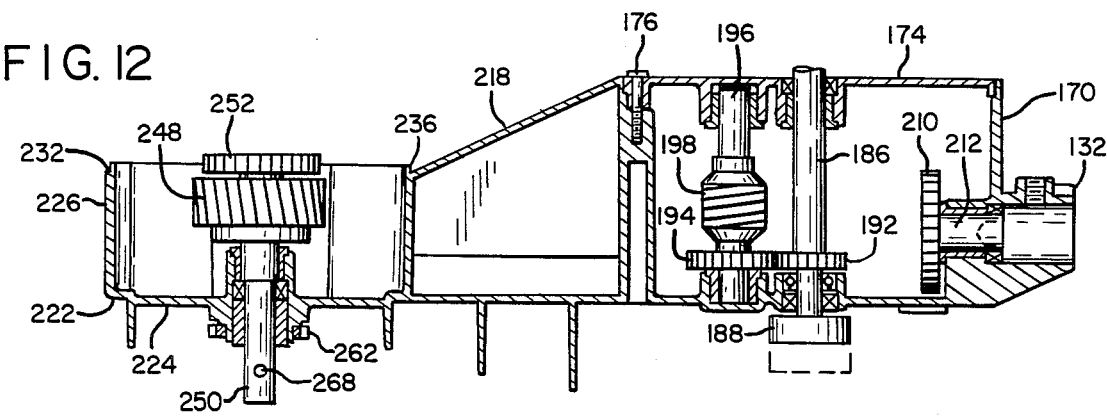
FIGS. 12 and 13 are vertical longitudinal sectional views taken on the lines 12—12 and 13—13 of FIG. 11, respectively.

The transmission includes a vertical input shaft 186, best seen in FIGS. 10–12, journaled therein and having a bottom projecting end comprising a coupling portion 188 arranged for releasable connecting drive with coupling portion 160 in the motor housing by conventional coupling structure. Shaft 186 terminates at the top in the blender drive 130. As apparent, the output 130 comprises a direct drive from the motor.

Figure 15:
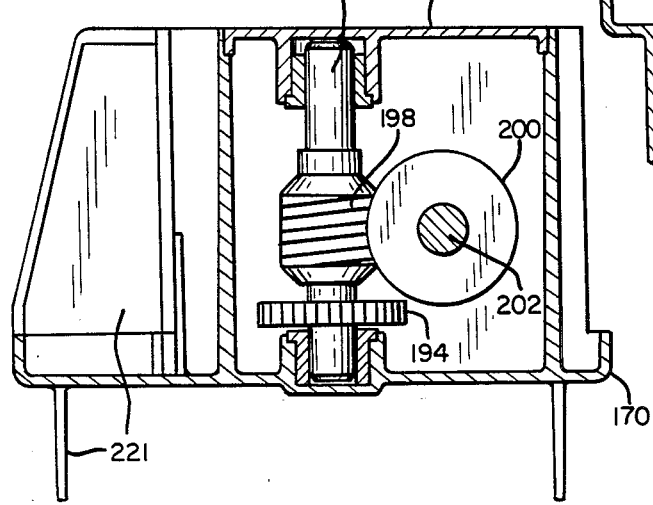

Shaft 186 has a pinion gear 192 keyed thereto which meshes with a gear 194, also seen in FIG. 15, keyed to a vertical shaft 196 journaled in the transmission housing. A worm gear 198 is also keyed to shaft 196 and meshes with a gear 200, FIGS. 10, 11, 13 and 15, keyed to an elongated horizontal shaft 202. A pinion gear 208, FIG. 16, adjacent the right hand end of housing 170 is keyed to shaft 202 and meshes with a gear 210 on a stub shaft 212 operatively connected to the power take-off 132.

Figure 13:
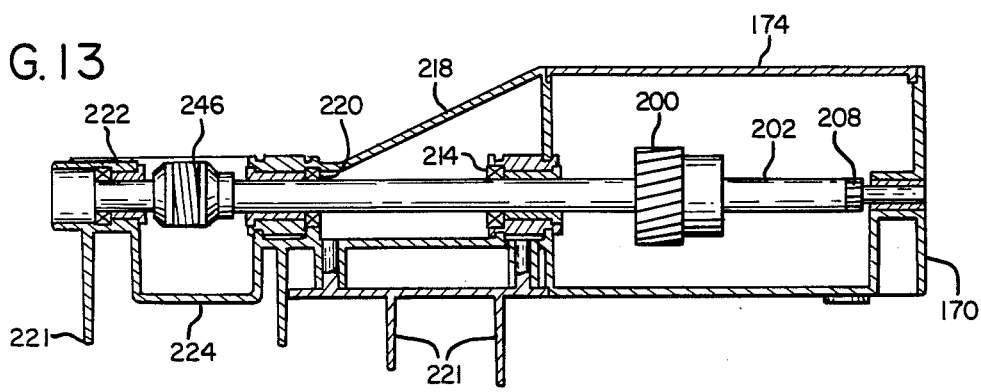

Horizontal shaft 202 has journaled engagement in defining walls of the rear enclosure 172, FIG. 13, including a seal 214 on the end of the enclosure opposite from the power takeoff 132, and such shaft projects past the seal into a forward enclosure 218. Such shaft projects beyond the opposite end of enclosure 218 and has journaled support in such opposite end as well. This journaled end also has a seal 220 therein. Seals 214 and 220 are oil seals and confine lubricating oil therein. These seals also protect the bearings from dust or the like. Transmission housing 170 has appropriate depending and laterally extending webs 221 for reinforcement.

Figure 14:
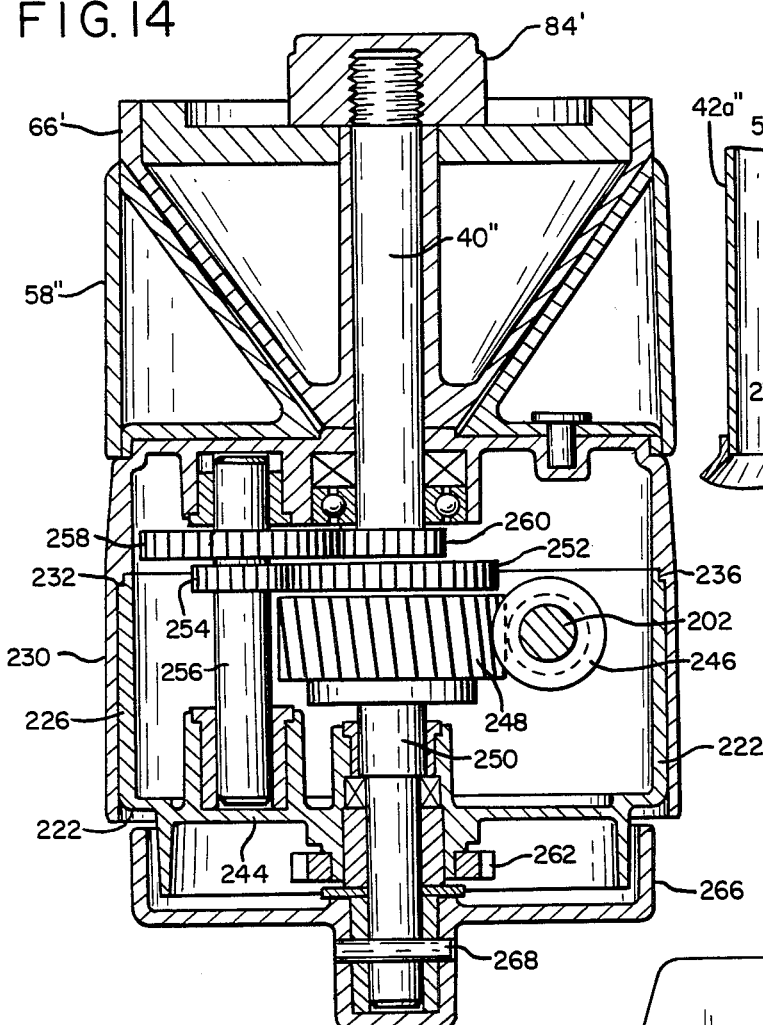
FIG. 14 is a sectional view of hopper and grinding means taken similar to FIG. 12 but at right angles thereto.

The projecting end of shaft 202 extends into an integral extension 222, FIGS. 10 and 12–14, of the enclosure 218 of the transmission housing 170. This extension has an open top but has a bottom wall 224 and a circular upright defining wall 226. With particular reference to FIGS. 10 and 14, the extension 222 supports an inverted cup-shaped base 230. This base overlaps the extension 222 and has an inner surface offset 232 providing a shouldered removable support on the extension. The base 230 in the area of the transmission has a cut-away portion 236, FIG. 10, the lower edge of which seats on the transmission. Base 230 supports an upper base member 58" in seated engagement and such base member is associated with a grinding head 66' having the same grinding association with the base member 58" as was shown and described in the embodiment of FIGS. 1–7 as well as a driving but longitudinal adjustment of the head on a shaft 40", controlled particle size by means of an adjusting nut 84', and infeed means 92' and 94'. As described in connection with the embodiment of FIGS. 1–7, the ground flour works its way up between the grinding head and base and falls by gravity down the side of the grinding mechanism. In a preferred construction, the grinding area 70' between the head 66' and base member 58" is of progressively less dimension toward the top for accomplishing controlled discharge of ground grain.

Figure 17:
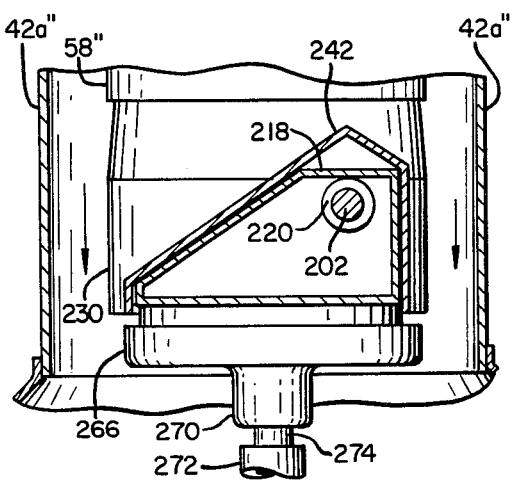
FIG. 17 is a fragmentary sectional view taken on the line 17—17 of FIG. 10.
Figure 16:
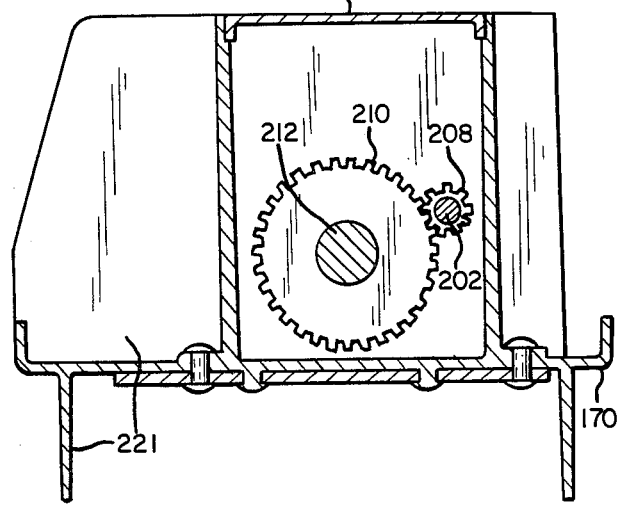
FIGS. 15 and 16 are vertical cross sectional views taken on the lines 15—15 and 16—16 of FIG. 11, respectively.

A path for directing the flow down into a mixing bowl 36' is formed by a combination hopper 42" and shroud 42a" that encircles the grinding portion with an enlarged diameter to form a space or passageway 72' for directing the ground flour into the bowl. This shroud has a flanged extension 240 freely overlying the top edge of the mixing bowl. The shroud 42a" is cut away in the area of the transmission and has a triangular deflector 242, FIGS. 10, 11 and 17 which deflects falling flour around the sides of the transmission enclosure 218. The hopper 42" and its shroud 42a" are separate pieces for purposes of assembly and disassembly and for cleaning.

Horizontal shaft 202 has a worm gear 246, FIGS. 11, 13 and 14, keyed thereto in the extension 222 at one side of defining wall portion 226, and this gear meshes with a gear 248 keyed on a vertical shaft 250 having journaled support at its lower end in the bottom wall 224 of extension 222. A large gear 252 is keyed to the upper end of shaft 250 and this gear meshes with a smaller gear 254 keyed on a shaft 256 journaled at its opposite ends in the extension 222. Shaft 256 has an enlarged gear 258 keyed thereto which meshes with a smaller gear 260 keyed to the shaft 40" of the grinding mechanism, The lower end of shaft 250 projects below extension 222 and has a gear 262 keyed thereto. This shaft at its bottom end supports a chuck member 266 by means of a pin connection 268 and such chuck member has a chuck socket 270 for a mixing attachment 272. The drive for the chuck socket comprises a shaft 274 having a gear 276 keyed thereto which meshes with the gear 262. Upon rotation of the shaft 250, chuck member 266 rotates therewith in concentric relation but since the drive attachment for the mixing attachment is offset or eccentric, the mixing attachment will sweep in a circle around the mixing bowl 36' while at the same time being rotated on its own axis.

Mixing bowl 36' is supported on an extension 134a of the base 134 and has suitable support connection 280 thereto such as a thread-type connection.

A cover 282 is provided, FIGS. 8–10, for enclosing the transmission 170, this cover fitting around the transmission at the sides and the power take-off end and being contoured or cut away at the other end to fit partially around the hopper flange. It has a removable cap 284 and a well portion under the cap for access to the output 130 for the blender. Hopper 42" has a removable lid 286 for easy access. Suitable circuitry 288, FIG. 10, for the motor 154 is provided including control means 290, FIG. 8, in a conventional arrangement for varying the output speed of the motor.

In the embodiment of FIGS. 8–17, a bread dough making machine which simultaneously grinds grain and mixes the dough is provided in combination with other food processing means, such being accomplished with a single drive motor. In the gearing or drive arrangement, the blender output 130 has, as stated, a direct drive from motor 154. Such output speed is controlled by control panel 290. Power take-off 132, which will be used most likely for driving a meat grinder or similar attachment, has a reduced speed in view of the geared down ratio through gears 192 and 194, through gears 198 and 200, and through gears 208 and 210. The speed of drive for the grinding head 66 is increased relative to the output 132, however, through gearing 252, 254 and through gears 258 and 260. The rotating speed of the chuck member 266 with shaft 250 is slow but the speed of rotation of the mixing attachment drive 270 is faster through the geared up arrangement of gears 262 and 276.

The integrated assembly of motor housing, transmission 170 and hopper 42" is arranged to be tilted up on pivots 146 and locked in desired positions relative to the stand by engagement of spring pressed latch mechanism 146 in a selected aperture 148. In the lowermost position of the assembly, a depending web 221 on the transmission 170 seats on the upstanding web 138 of the base stand for good support. The hopper 42" is readily removed for cleaning by lifting it off its shroud 42a" and this shroud is also readily lifted off for cleaning. The transmission 170 is an integral piece that is readily secured and removed for assembly and repair. Its gears are enclosed in various compartments and isolated from food areas.

It is to be understood that the forms of our invention herein shown and described are to be taken as preferred examples of the same and that various changes in the shape, size and arrangement of parts may be resorted to without departing from the spirit of our invention, or the scope of the subjoined claims.

Having thus described our invention, we claim:

1. A bread dough making machine comprising:
   (a) having inverted cone-shaped member having upper end and a lower ends;
   (b) a base member having a tapered recess with a defining wall receiving said cone-shaped member, the wall of said recess being shaped to provide a grinding area between the wall and said cone-shaped member with said grinding area being progressively less toward the upper end of said cone-shaped member, said grinding area having outlet means, at least one of said base member and cone-shaped member having a grinding surface and at least one of said base member and cone shaped member being rotatable relative to the other of said base member and cone shaped member for reducing grain to a smaller particulate form, said grinding area having a closed bottom end at the lower end of said cone-shaped member, and said cone-shaped member forcing ground grain upwardly and discharging it from the upper end of said cone-shaped member,
   (c) power drive means for rotatably driving said cone-shaped member;
   (d) means arranged to feed grain to be ground into said grinding area; and a mixing arm on said power drive means arranged to mix ground grain from said grinding means with other bread ingredients and simultaneously to knead the ingredients into bread dough.

2. A food processing machine comprising:
   (a) a base frame;
   (b) a vertical hopper supported on said base frame and having an upper infeed end and a lower outfeed end;
   (c) grinding means supported on said base frame under the outfeed end of said hopper, said grinding means including an inverted cone-shaped grinding member having an upper end, and a base member having a recess with a defining wall receiving said cone-shaped member, said defining wall being spaced from said cone-shaped member but in close relation to said cone-shaped member to form a grinding area between said defining wall and said cone-shaped member, said grinding area being tapered progressively to a narrowed dimension toward the upper end of said grinding member, at least one of said base member and cone-shaped member having a grinding surface and at least one of said base member and grinding member being rotatable relative to the other of said base member and grinding member for reducing grain to a smaller particle form, said grinding means further having an upper end and a lower end and including an infeed portion arranged to receive grain from said hopper and an outfeed portion arranged to discharge ground grain outwardly, said grinding area having a closed bottom end at the lower end of said grinding means, and said grinding means forcing ground grain upwardly and discharging it from the upper end of said grinding means;
   (d) power drive means, on said base frame for rotatably driving said grinding means;
   (e) a passageway area encircling said grinding means and having an upper receiving end communicating with said outfeed portion of said grinding means, said passageway area conveying ground material downwardly by gravity and having a bottom discharge end;
   (f) a mixing area disposed vertically below the discharge end of said passageway area and arranged to receive a mixing bowl for deposit of ground grain; and
   (g) a mixing arm on said power drive means and arranged to mix the ground grain which falls by gravity from said passageway area into said mixing area with other ingredients.

3. The food processing machine of claim 2 wherein said power drive means includes an upright shaft having upper and lower ends, said shaft terminating at its lower end in said mixing arm, said cone-shaped member being secured on said shaft for rotation relative to said base member in a grinding operation, said recess having upright surface grooves, and said cone-shaped member having grinding teeth cooperating with said grooves to form grinding edges.

4. The food processing machine of claim 2 including adjustment means on one of said cone-shaped member and said base member for adjusting a width of the grinding area, said adjustment means being disposed at the upper end of said cone-shaped member and in said hopper.

5. The food processing machine of claim 1 wherein said power drive means includes a transmission, a forward extension on said transmission, gear means in said extension and arranged to operate said grinding means and said mixing arm, said hopper having a bottom extension forming said passageway area.

6. The food processing machine of claim 5 wherein said bottom extension is arranged to direct ground grain from the outfeed portion of said grinding means around said transmission and into said mixing area.

* * * * *